United States Patent [19]
Evans

[11] 3,789,397
[45] Jan. 29, 1974

[54] THREE DIMENSIONAL DISPLAY SYSTEM
[75] Inventor: James W. Evans, Largo, Fla.
[73] Assignee: Athletic Swing Measurement, Inc., Clearwater, Fla.
[22] Filed: Dec. 10, 1971
[21] Appl. No.: 206,615

Related U.S. Application Data
[63] Continuation-in-part of Ser. No. 858,628, Sept. 17, 1969, abandoned.

[52] U.S. Cl. ................................. 343/7.9, 343/6 R
[51] Int. Cl. ............................................. G01s 7/04
[58] Field of Search .................. 343/6 R, 6 TV, 7.9

[56] References Cited
UNITED STATES PATENTS
3,275,882  9/1966  Morse ................................ 343/7.9
2,604,607  7/1952  Howell ............................... 343/7.9
3,427,611  2/1969  Enenstein .......................... 343/6 R
3,258,766  6/1966  Munz ............................... 343/7.9 X Primary Examiner—Malcolm F. Hubler
Attorney, Agent, or Firm—Duckworth, Hobby & Allen

[57] ABSTRACT

A display system for indicating in three dimensions and to a selected scale the position of a remotely observed body or bodies in three dimensional space, the system employing a three dimensional display region and at least two spaced, trainable laser beam assemblies, each of which directs a laser beam along a line which simulates to scale a line of actual direction to the body being observed, and the position of a body being indicated by spot illumination occurring at the intersection of the two beams.

4 Claims, 6 Drawing Figures

3,789,397
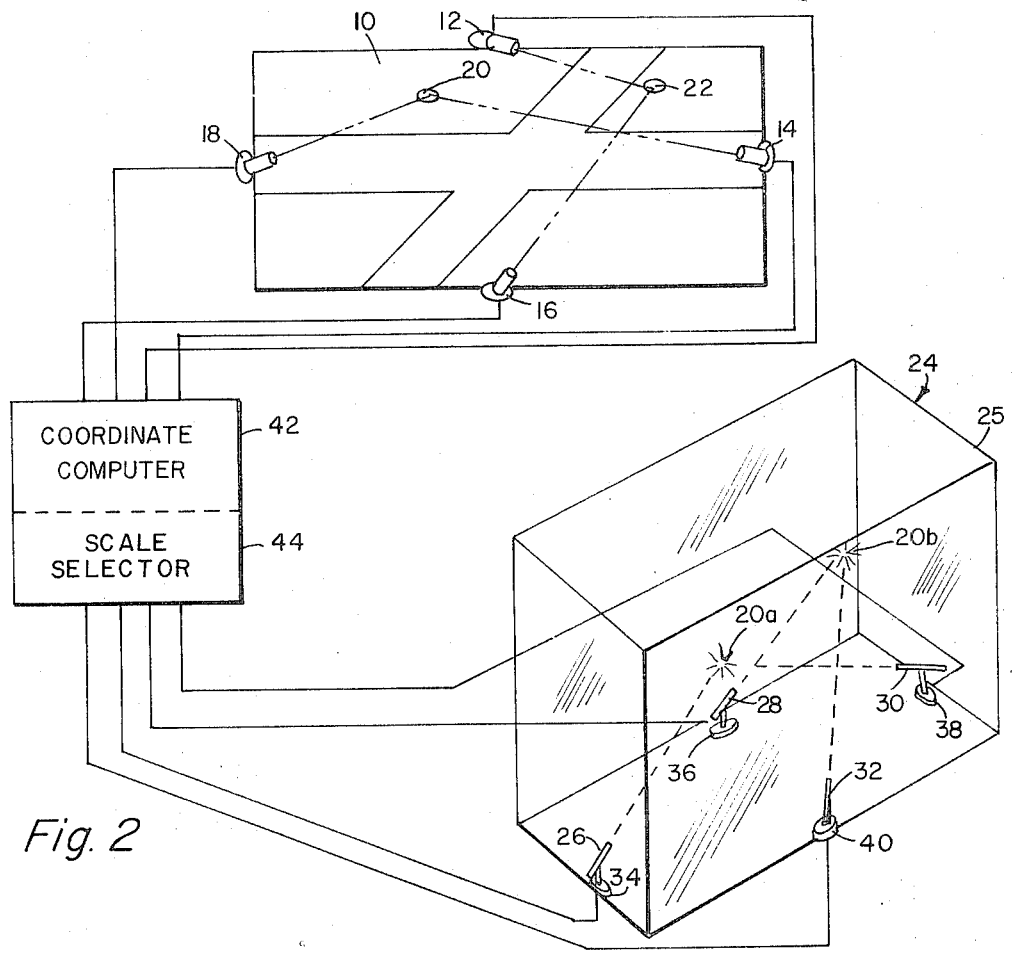
Fig. 2
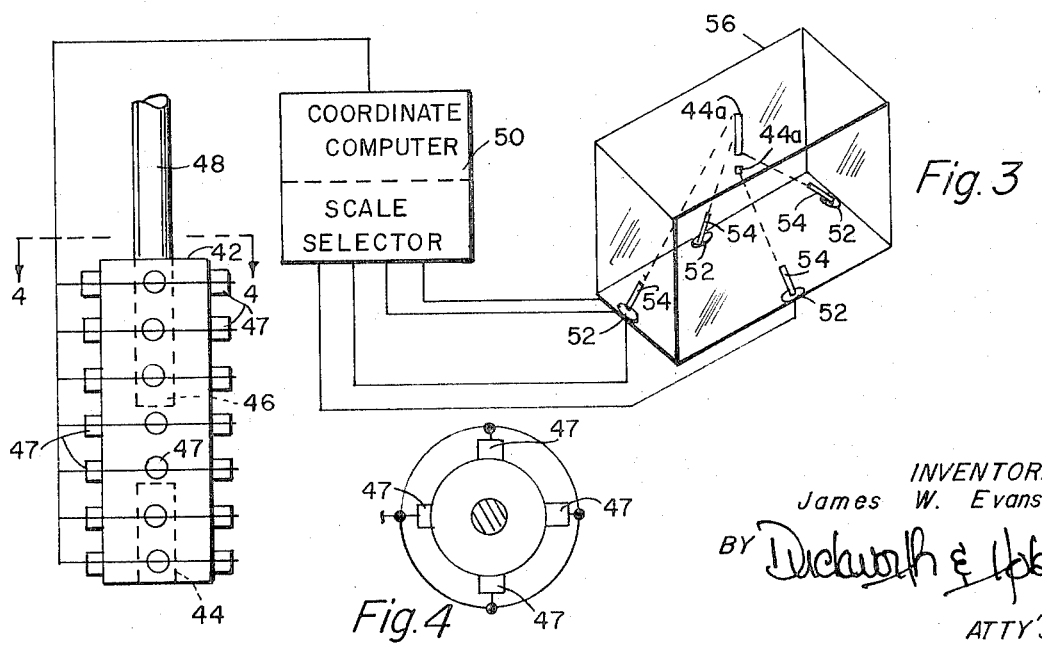
Fig. 3
Fig. 4
INVENTOR.
James W. Evans
BY Duckworth & Hobby
ATTY'S

THREE DIMENSIONAL DISPLAY SYSTEM

This is a continuation-in-part of application Ser. No. 858,628, filed Sept. 17, 1969, now abandoned.

BACKGROUND OF THE INVENTION

This invention relates to systems for simulating or displaying the relative position of an object or objects, and particularly to a system for creating a three dimensional, scaled display of a region, and of selected stationary or moving objects within that region.

There are many instances in which it is necessary or desirable to provide a three dimensional display of a three dimensional situation which is not viewable or conveniently viewable by direct observation. A particular illustration is that of aircraft traffic in the vicinity of an airport. In this example it is the responsibility of the controller at the airport to observe these aircraft and safely guide them into and away from the airport. His basic tool is now radar which, while providing him with locational information with respect to each aircraft, does not provide means for displaying the information in three dimensional form whereby a controller can actually see the relative position of aircraft in flight.

It is accordingly an object of this invention to provide a three dimensional display system whereby an observer can readily observe three dimensional relations between objects, fixing or moving, in space.

It is a further object of this invention to provide a three dimensional display system for recreating, to a selected scale, airplane traffic within a selected region, such as that surrounding an airport, whereby an airport controller viewing the display can readily observe relative movement of aircraft and safely guide them within established flight patterns.

It is still a further objects of this invention to generally provide means of remotely displaying three dimensional situations which are not directly observable, but which are susceptible of measurement.

In accordance with the invention, means are provided for detecting and measuring in three dimensional space the position of an object or objects with respect to a point of reference and providing signals representative of such position or positions. A display region is provided which encompasses a volume having three dimensions of appropriate size to locate within it, to a selected scale, markers at positions corresponding to the position which may be assumed by actual objects to be observed and simulated. Two or more sources of narrow beam radiant energy such as provided by lasers are positioned within or adjacent to the display region and are trainable in directions which permit intersection of beams at any point within the display region wherein it is anticipated that a display marker may be required to appear. Servo means receive the position signals and train, or otherwise direct, radiation from connected sources of radiant energy along lines of direction which intersect at a point which is a scaled three dimensional representation of the actual position of the object being observed. The intersection of the beams of radiant energy produce an illuminated spot of light at the point of intersection which, depending upon the character of the beams, and in some instances atmosphere in the display region, is displayable at varying levels of beam intensity. By employing powerful laser beams or other light sources capable of producing sufficient interference between beams, or ionization of atmosphere, there occurs at the point of intersection of the beams an illuminated spot or marker. Thus, the system of this invention provides a point of illumination in space which simulates to a desired scale the position of an object in space. By means of a plurality of pairs or other combinations of sources of radiant energy or by means of rapidly directing radiation from a single pair of sources to first produce an illuminated spot representative of the position of one body and then another at a speed which equals or is faster than persistency of human vision, the appearance of multiple spots representative of the position of several objects may be displayed and their relative location and relative motion made visually observable. By the use of multiple beams, three or more, or by employing atmospheres other than air consisting of gases or combinations of gases which are more readily illuminated, or by ionization, varying combinations of numbers of beams, beam intensity and atmospheres produce viewable spots of illumination sufficiently bright and for sufficient periods of time for viewing. Further, spots created by the optical interference of light beams may be employed.

The system of this invention provides, for example, a standard scale display to be normally used permitting the scanning of a large area and in instances when aircraft are in extremely close proximity, it also provides for the expansion of the scale and for a more accurate determination of their proximity.

The invention has general applicability to a variety of machines and apparatus wherein data is available by means of locational sensors positioned to observe critical objects, indicating their position or movement or both, and then by appropriately displaying the locational information as discussed above on the same scale or on a magnified scale, the picture of movement with respect to other objects, fixed or movable, can be clearly visibly displayed. By appropriate computation and translation of the detected measurement data, objects may be depicted in a speed different from actual speed, for example, a turbine rotating at 3,000 revolutions per minute may be scaled to a fraction of this figure in order to actually view with the eye a replica of motion.

Another application is in undersea locales and displaying the position of submarines with respect to undersea terrain and other vessels.

Still another application is in the field of drilling, as in the drilling of a mine shaft. It may be, for example, necessary to drill a shaft which intersects far below ground with another shaft or to contact a particular mineral seam at a certain point. In accordance with the present invention and with appropriate positioned sensors providing directional data of the drill, hole or shaft being drilled and related shaft or other region of concern, it becomes simple to display in three dimensions the drilling operation and to thus actually see that a drill is progressing along a desired path.

Still another application relates to the machining of precise configurations such as, for example, a valuable slab of material by means of a programmed or otherwise directed cutting tool. What happens in many instances is that as cutting proceeds, certain compensations are discovered to be necessary to provide an accurate cut. By appropriate use of positional sensors it is possible to actually display the work piece and tools and thus readily note what compensations might become necessary.

Still another field of application for the invention is in medical and surgical treatment wherein the location of an instrument or condition within the body may be displayed in three dimensional form to more readily and more accurately disclose actual movement and position of objects or conditions. With respect to the term "conditions", it is meant that, for example, assuming that the area of generation of a particular brain wave can be detected; then the position of this phenomena may be three dimensionally displayed at its true position.

Still other applications include the control and docking of space craft and the remote control of space vehicles in general, either in transit to a space destination or while on a body, such as the moon or a planet.

BRIEF DESCRIPTION OF THE DRAWINGS

These and other objects, features and advantages of the invention will become more apparent from the following description when considered together with the drawings in which:

FIG. 2 is a diagrammatic illustration of the invention as applied to aircraft in flight;

FIG. 3 is a diagrammatic illustration of the invention as applied to a machine tool or drilling operation;

FIG. 4 is a detail of the invention illustrated by a view along lines 4—4 of FIG. 3;

FIG. 5 is a diagrammatic illustration of the invention as applied to observation of movement of a mechanism such as a rotor in a turbine; and FIG. 6 is a detail of a portion of the invention illustrated in FIG. 5.

DESCRIPTION OF THE PREFERRED EMBODIMENTS

Figure 1:
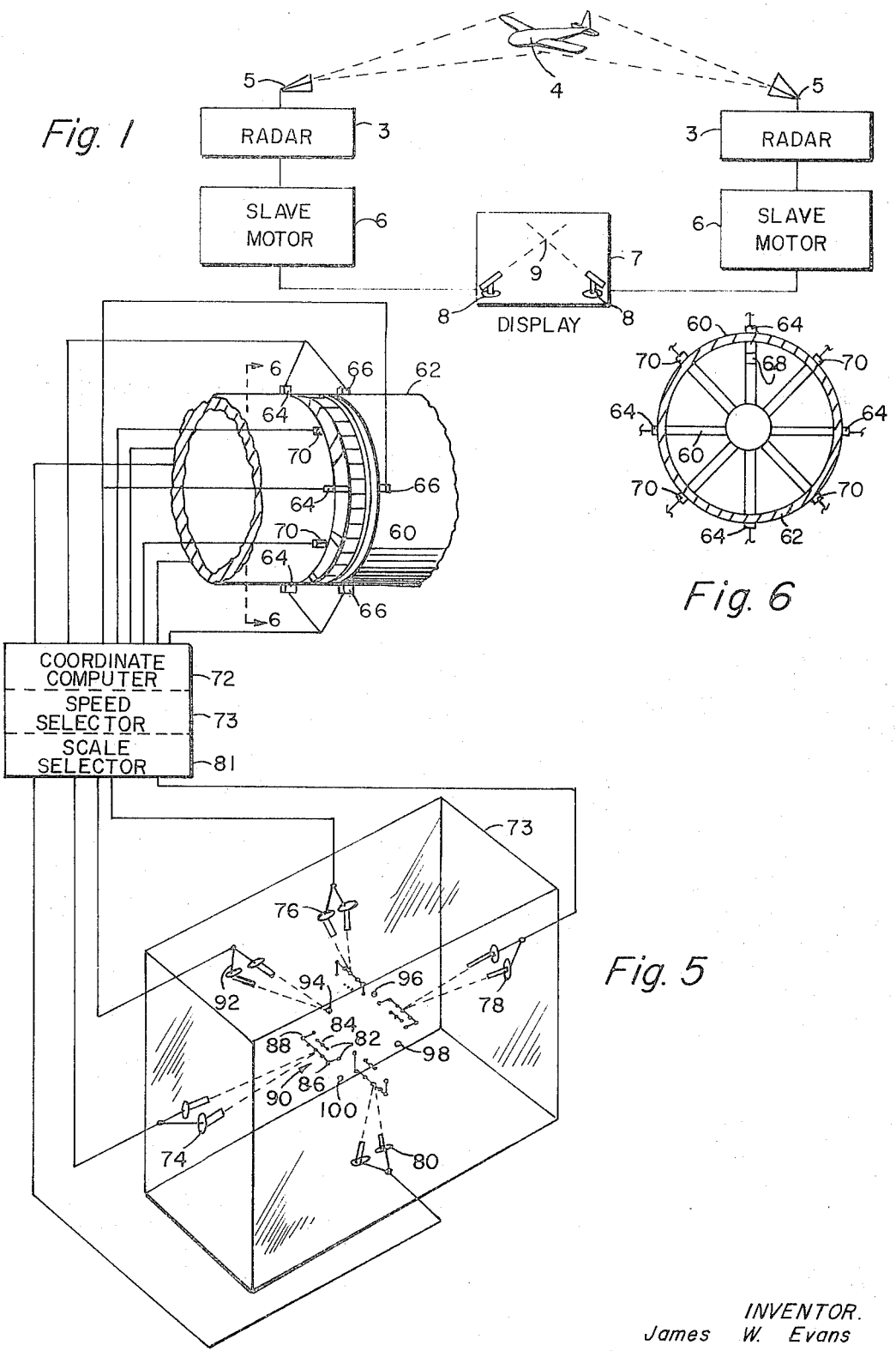
FIG. 1 is a diagrammatic illustration of one embodiment of the present invention.

Referring now to FIG. 1, a simplified embodiment of the present invention is illustrated in which an airplane 4 is being tracked by a pair of directional antennas 5 as it moves through the atmosphere. The antennas 5 may be operated by radio tracking a radar 3 for tracking the target 4. The antennas 5 can either track a signal generated in the target 4 or by using a radar signal from the radar 3 generating a signal for reflection off the target 4. The antennas can be slaved by means of slave or syncro motors 6 to a pair of lasers 8 which are located in a display case 7, so that the lasers 8 will always be pointing at the same angle, including both azimuth and elevation, as their respective connected antennas 5. The display casing 7 is made of a filter material adapted to allow the passage of visible light but block the particular frequency of the lasers 8 so that even though the lasers 8 may be of the type producing low energy, such as a diode laser, there would be no opportunity to damage the eyes of the observer. The proper placement of the pair of lasers 8 relative to the antennas 5 allows the lasers to produce a beam which always intersects at 9 whenever both antennas 5 are tracking the same target 4. Thus, a principal feature of the present invention is that intersecting monochromatic light as produced from certain types of lasers produces a hotspot or visible spot 9 when they intersect, so that an individual watching the display casing 7 can follow a target in a three dimensional display. The slave motors 6 can be of any slaving system desired and such systems are commonly used in applications as simple as home television antenna rotator systems and on much more complex applications as in slaving radar antennas together such as might be provided in a dual tracking system where various types of voltage control servos can be utilized. For instance, the antennas can be slaved to a laser by being each controlled by a synchro or selsyn motor or plurality of motors. It can thus be seen from FIG. 1 that a simple yet effective system for producing a three dimensional display has been provided but more complex embodiments are hereinafter illustrated. It should be kept in mind that the basic concept is that two intersecting beams of monochromatic light from lasers create a spot of light and the position of these beams relative to a target produces a three dimensional display which can be operated from the simple system illustrated in FIG. 1 to much more complex systems. For instance, the radar antennas can control the laser in a manner similar to various radar controlled firing systems in which an antenna traces a target and generates signals as to azimuth, elevation and range, for directing a gun to the same target. This, however, is a much more complex system inasmuch as the present system only requires tracking through the azimuth and elevation to give the angles for directing each laser beam in a particular direction. Thus, from the system of FIG. 1 a standard modification is to interject a computer between the unit to be tracked and the servos to increase the degree of accuracy in positioning of the servos. This allows many other modifications in that the computer would also insure that pulsing lasers would not conflict with other laser beams when a plurality of beams are used to track more than one target. The system could utilize a strictly analog computer such as used in gun control systems or could use a more advanced system having an analog to digital converter for utilizing digital data such as used in the missile tracking systems in which the digital data from an ocean tracking station is transmitted to a central computer for giving continuous target location.

Referring now to FIG. 2, a system for scanning air traffic in the vicinity of an airport 10 and displaying same on a scale or scales sufficiently small to be conveniently housed but sufficiently large for an air traffic controller to determine distances between planes with sufficient accuracy as to be able to safely direct them. Radar units 12, 14, 16 and 18 rapidly scan the region in the vicinity of airport 10 of concern and determine the three-dimensional coordinates of aircraft, e.g. aircraft 20 and 22.

The radar units are spaced and are of such number to make it possible for at least one, and in most instances two, of the radars to view any point in the region being scanned despite the presence of side by side or over and under positioned planes. This capability enhances accuracy and provides some redundancy of data for greater reliability.

Display 24 is housed in a protective glass enclosure 25, as determined by the radiation and working atmosphere, and is a miniature version of airport 10 and its environs.

It contains a selected atmosphere, but which may be simply air in the case of laser radiators and certain other phased light radiators. In the latter case enclosure 25 may not be necessary. Lasers assemblies 26, 28, 30 and 32 consist of narrow beam radiators of coherent light and are directionally trained by identical servo units 34, 36, 38 and 40 which orient the lasers along a line of direction which simulates the actual line of direction of a sighted aircraft from an actual or assumed reference position. The servo units are capable of aiming the lasers at any point within enclosure 24. A point of illumination occurs at the point of intersection of at least two of the laser beams which are normally pulsed on only when the lasers are trained toward a point of simulated plane position. Coordinate computer 42 receives training angles and range data from radar units 12, 14, 16 and 18 representative of the location of each aircraft sighted, e.g., 20 and 22. Coordinate computer 42 determines training angles for at least two of servo units 34, 36, 38 and 40 to produce accurately positioned beam intersections in terms of the desired scale of presentation as selected by the operator by means of scale selector 44, which electrically computes the final data supplied servo units 34, 36, 38 and 40. Aircraft 20 and 22 are displayed as spots 20a and 20b, respectively. Protective glass enclosure 25 is constructed of a material which filters out radiation in the "red" region as radiated by the lasers but permits viewing of the illuminated spots provided by the intersection of laser beams which spots contain a wider spectrum of illumination than the direct radiation from the lasers.

FIGS. 3 and 4 illustrate another application of the invention. In it a work piece 42 initially includes a cavity 44 and it is desired to drill a hole 46 in the work piece to precisely meet and align with cavity 44. Appropriate sonic, electrical or radiation type detectors 47 capable of detecting distance to a point or points on the periphery of cavity 44 and hole 46 are positioned on work piece 42. Cavity 44 and hole 46, as drilled, are displayed by a composite of data which tends to form three dimensional outlines of them, 44a and 46a, respectively, in enclosure 56.

The data from detectors 46 is fed to coordinate computer-scale selector 50 which then supplies coordinate data to servos 52 of laser units 54. For each locational point to be displayed, data is supplied to two of laser units 54 which project beams which intersect at the desired point of display. By detecting and computing a sufficient number of display points on the periphery of cavity 44 and hole 46 and displaying them as points of light in enclosure 56, the outlines 44a and 46a are formed in three dimensions.

In operation, drill 48 would be initially positioned by measurement and as the drilling of hole 46 progresses the progress of drill 48 is observed by the periphery of hole 46 which it generates, and any corrections necessary to achieve accurate intersection with cavity 44 are readily observable. In order to observe fine tolerances and precise drilling the scale of display may be greatly enlarged over actual size. Where so enlarged, a small region of the work piece is blown up to fill a large portion of display enclosure 56, the limitations being those placed on the system by the accuracy of the detectors. As a practical matter, and with existing detectors sensing dimensions of less than 0.001 inches, extreme accuracy can be achieved by enlargement which would enlarge the display as much as a thousand or more times.

FIGS. 5 and 6 illustrate still another embodiment of the invention. In it the task to be performed is that of examination of the operation of a housed mechanism such as a housed turbine rotor 60. In such an application of the invention, the speed of the moving element, rotor 60 in this case, is often such that it cannot be directly observed by the eye even though an observation port is available, and in most instances, no such port is available. As shown in FIG. 5, rotor 60 is positioned in housing 62 and it is desired to monitor the movement of rotor 60 with respect to the housing or some reference point or line on the housing.

Four pairs of sensors 64 and 66 are positioned about the periphery of housing 62 at 90° intervals. Sensor 64 is positioned above and to one side of rotor 60 and a sensor 66 is positioned above and to the other side of rotor 60 on the exterior of housing 62. They are typically of the proximity type which provide a variable electrical output as function of distance to the rotor. The differential output between pairs of sensors is an indication of the side to side movement, deviation from true axial alignment, and their sum is an indication of the proximity to housing 62 to a point on the rotor, or radial alignment. Thus at any time the portion of the rotor adjacent a particular pair of sensors is examined and as the rotor turns, continuous data is produced indicative of the rotation of the rotor with respect to these sensors and thus with respect to housing 62. With four pairs of sensors positioned about the periphery of the housing at 90° intervals, this data is reproduced for four positions. Indication of rotor position of rotor 60 is provided by electrical identification of a point on the rotor as it passes selected points, in this case, four points. As shown, a radio isotope source 68 is positioned on a spoke and then by means of detectors 70 positioned uniformly about housing 62 at 90° intervals and responsive to radiation there is provided a pulse each time that the radio isotope source 68 passes a detector 70. Alternately, rotor position data may be obtained from the shaft of rotor 60 by means not shown.

Electrical outputs of each pair of sensors 64 and 66 are applied to coordinate computer 72 which computes the position of rotor 60 with respect to a reference position. Reference positional data is stored in coordinate computer 72 and is representative of the position of housing 62 with respect to the periphery of rotor 60 and a selected reference representative of the axial alignment of rotor 60. The reference and periphery of rotor 60 are displayed by means of the intersection of two laser beams in the manner described above, the lasers being trained in accordance with computed data from coordinate computer 72 and produce sequentially intersecting beams at sufficient number of points to display the periphery of rotor 60 and reference. Display 73 includes laser pairs 74, 76, 78 and 80 which provide locational data from correspondingly positioned sensors 64 and 66 on housing 62. In order to further facilitate viewing, speed selector 73 electrically divides the actual speed of rotor 60, which is derived from detector 70, by an appropriate amount to make the display rotor move slow enough for examination. Still further, scale selector 81 provides means of magnification of displayed images, for example, to expand the presentation of one of the display points, and this is achieved by appropriate computed increase in scale of coordinates by scale selector 81.

Basically, each pair of sensors 64 and 66 provide discret measurements which are reproduced by a series of beam intersections 82 which if sufficiently close, appear to produce a continuous line 84 indicative of the periphery of rotor 60. Similarly reference dots of light 86 representative of housing 62 and extended reference 88 provide a frame 90 with respect to which the simulated movement of rotor 60 may be examined to observe side to side, axial, and radial deviations from true rotation of rotor 60. While display 73 as shown simulates only portions of rotor 60, by the employment of additional sensors 64 and 66 and additional laser beam radiators, additional observations of rotor 60 may be accomplished. Alternately, by means of position interpolation in coordinate computer 72 and by the use of additional laser beam radiators or faster scanning by the existing laser beams, additional points may be displayed which will approach display of the whole rotor.

Rotor positional data is fed from detectors to coordinate computer 72 which drive laser beam pairs 92 which create light dots at points 94, 96, 98 and 100 when radioactive source 68 on rotor 60 passes a corresponding detector 70. Thus each time one of these light dots appear an observer can clearly see deviations in orientation of rotor 60. Of course, by shifting the position of detectors 70 or adding additional detectors 70, additional positional reference data may be obtained. Alternately, where the position of rotor 60 is constantly monitored, as for example by taking off shaft position data, laser pairs 92, which, as illustrated, provide beam intersections at points 94, 96, 98 and 100 would be trained to provide a dot of light which rotates in a circle to provide a continuous positional reference.

While the invention has been described largely in terms of the employment of interfering or intersecting laser beams, it is to be understood that the use of other radiators producing light at the point of intersection or interference between two or more beams of radiation is within the contemplation of this invention.

I claim:

1. A three-dimensional display apparatus comprising in combination:
    a. a plurality of position detecting means for detecting the elevation and azimuth of an object in space with respect to the detecting means;
    b. a display region;
    c. a plurality of laser beam sources located in said display region in a position analagous to said detecting means; and
    d. control means coupled to said position detecting means and to said laser beam sources; said control means being responsive to said position detecting means to direct said beams of said laser beam sources at an angle analagous to the angle from each position detecting means to said object in space whereby pairs of laser beams will intersect in space in said display region at an analagous point to said object in space, thereby providing a three dimensional display.

2. The apparatus in accordance with claim 1 in which said position detecting means includes directional antennas and said control means includes slaving motors for slaving said directional antennas to said laser beam sources whereby the movement of each antenna in said position detecting means produces simultaneous and equivalent movement in one said laser beam source.

3. A three dimensional display system for indicating in three dimensions and to a selected scale the position of an object in three dimensional space relative to its environment comprising:
    a. position detecting means for providing signals definitive of the position of an object in space with respect to a reference point;
    b. a display region and display reference position;
    c. laser radiation means including at least two laser sources of narrow beam radiant energy for producing a spot of light at the intersection of said narrow beams of radiant energy;
    d. control means responsive to said signals from said position detecting means for directing said sources of laser beams along lines which intersect in said display region at a point with respect to said display reference position which is a scaled replica of position of a said object, whereby there is created a scaled presentation in three dimensions of a said object with respect to said first named reference position.

4. A three dimensional display system as set forth in claim 3 wherein said position detecting means comprises radar means for scanning a predetermined region and providing signals definitive of the position of objects encountered in the said region.

* * * * *